(12) United States Patent
Nagahama

(10) Patent No.: US 11,780,987 B2
(45) Date of Patent: *Oct. 10, 2023

(54) LIGHT-BLOCKING MEMBER, BLACK RESIN COMPOSITION, AND BLACK RESIN MOLDED ARTICLE

(71) Applicant: KIMOTO CO., LTD., Saitama (JP)

(72) Inventor: Tsuyoshi Nagahama, Saitama (JP)

(73) Assignee: KIMOTO CO., LTD., Saitama (JP)

( * ) Notice: Subject to any disclaimer, the term of this patent is extended or adjusted under 35 U.S.C. 154(b) by 343 days.

This patent is subject to a terminal disclaimer.

(21) Appl. No.: 15/573,604

(22) PCT Filed: May 17, 2016

(86) PCT No.: PCT/JP2016/064556
§ 371 (c)(1),
(2) Date: Nov. 13, 2017

(87) PCT Pub. No.: WO2016/186097
PCT Pub. Date: Nov. 24, 2016

(65) Prior Publication Data
US 2018/0134862 A1 May 17, 2018

(30) Foreign Application Priority Data

May 21, 2015 (JP) ................................. 2015-103885

(51) Int. Cl.
*C08K 3/04* (2006.01)
*B32B 27/20* (2006.01)
(Continued)

(52) U.S. Cl.
CPC ................ *C08K 3/04* (2013.01); *B32B 27/20* (2013.01); *C08L 101/00* (2013.01); *G02B 5/003* (2013.01);
(Continued)

(58) Field of Classification Search
CPC ................ C08K 3/04; C08K 2201/014; C08K 2201/003; C08K 2201/005; G02B 5/003;
(Continued)

(56) References Cited

U.S. PATENT DOCUMENTS

| 4,894,279 A | * | 1/1990 | Sachdev ................ B41M 5/245 |
| | | | 101/462 |
| 6,309,118 B1 | * | 10/2001 | Konno ..................... B41J 35/18 |
| | | | 400/240.3 |

(Continued)

FOREIGN PATENT DOCUMENTS

| GB | 2321675 B | * | 8/2000 | ............ F16C 33/043 |
| JP | H09-133806 A | | 5/1997 | |

(Continued)

OTHER PUBLICATIONS

Lee, Effect of Conductive Agents in Spinel LiMn2O4 Cathodes on Electrochemical Performance of Li-ion Batteries, 2006, Short Communication, J. Ind. Eng. Chem., vol. 12, No. 6, pp. 967-971. (Year: 2006).*

(Continued)

*Primary Examiner* — Monique R Jackson
(74) *Attorney, Agent, or Firm* — BACON & THOMAS, PLLC

(57) ABSTRACT

Provided are a light-blocking member, a black resin composition, and a black resin molded article in which the optical density per predetermined thickness is increased. In a light-blocking member (1) comprising a substrate (2) and a light-blocking membrane (3) provided on at least one surface of this substrate (2), the light-blocking membrane (3) containing a binder resin (31), a first black pigment (32) having an average particle diameter $D_{50}$ of 0.4 to 2.5 μm, and a second black pigment (33) having an average particle diameter $D_{50}$ smaller than this is employed. The average particle diameter $D_{50}$ of the second black pigment (33) is (Continued)

preferably 0.01 to 0.3 μm. The optical density of the light-blocking membrane (3) is preferably 0.54 to 2.00 ($\mu m^{-1}$) in terms of thickness.

6 Claims, 1 Drawing Sheet

(51) Int. Cl.
  *G02B 5/00* (2006.01)
  *C08L 101/00* (2006.01)
  *G02B 27/00* (2006.01)

(52) U.S. Cl.
  CPC ...... *G02B 27/0018* (2013.01); *B32B 2264/10* (2013.01); *B32B 2307/41* (2013.01); *C08K 2201/001* (2013.01); *C08K 2201/003* (2013.01); *C08K 2201/014* (2013.01)

(58) Field of Classification Search
  CPC .............. B32B 2264/108; B32B 27/20; B32B 2307/41; C09D 5/32; C09D 7/68; C09D 7/69
  See application file for complete search history.

(56) References Cited

U.S. PATENT DOCUMENTS

| | | | |
|---|---|---|---|
| 10,415,661 B2* | 9/2019 | Kobayashi | F16D 69/026 |
| 2004/0239842 A1 | 12/2004 | Hatakeyama et al. | |
| 2008/0269379 A1* | 10/2008 | Belmont | C09C 1/56 |
| | | | 106/311 |
| 2012/0202081 A1* | 8/2012 | Takahashi | G03B 9/00 |
| | | | 428/473.5 |
| 2014/0016203 A1* | 1/2014 | Toshima | G02B 5/0226 |
| | | | 359/599 |
| 2016/0167346 A1* | 6/2016 | Carney | C09D 7/42 |
| | | | 428/213 |
| 2018/0313491 A1* | 11/2018 | Verleene | C10M 107/30 |

FOREIGN PATENT DOCUMENTS

| | | |
|---|---|---|
| JP | H10-148702 A | 6/1998 |
| JP | 2003-266580 A | 9/2003 |
| JP | 2008 203841 A | 9/2008 |
| JP | 2015-183055 A | 10/2015 |
| KR | 2004 0090707 A | 10/2004 |
| KR | 2013 0059341 A | 6/2013 |
| WO | 2006/016555 A1 | 2/2006 |
| WO | 2012/005147 A1 | 1/2012 |

OTHER PUBLICATIONS

Busch, Lubricants, 9. Solid Lubricants, Ullmann's Encyclopedia of Industrial Chemistry, Wiley-VCH Verlag GmbH & Co. KGaA, published online Oct. 15, 2011. (Year: 2011).*

Graphite, Wikipedia (RTM), retrieved from "https://en.wikipedia.org/w/index.php?title=Graphite&oldid=1084098234" on Apr. 27, 2022. (Year: 2022).*

Molybdenum disulfide, Wikipedia (RTM), retrieved from "https://en.wikipedia.org/w/index.php?title=Molybdenum_disulfide&oldid=1080156103" on Apr. 27, 2022. (Year: 2022).*

Machine translation of JP2008203841A, published Sep. 2008, Powered by EPO and Google. (Year: 2008).*

International Search Report in corresponding International Application No. PCT/JP2016/064556, dated Aug. 16, 2016.

* cited by examiner

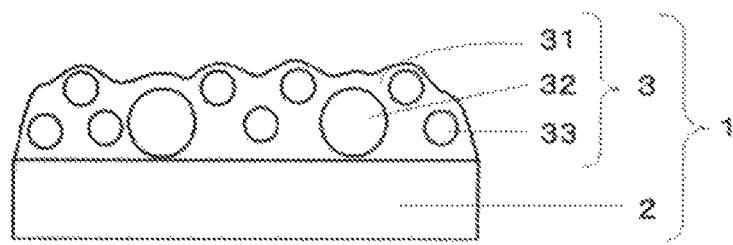

LIGHT-BLOCKING MEMBER, BLACK RESIN COMPOSITION, AND BLACK RESIN MOLDED ARTICLE

TECHNICAL FIELD

The present invention relates to a light-blocking member, a black resin composition, and a black resin molded article.

BACKGROUND ART

Conventionally, in an optical apparatus such as a camera or a projector, the inner wall surfaces of a camera, and the like are composed of members having light-blocking properties to prevent the occurrence of halation and ghosts due to outside light, and the like. As such a light-blocking member, for example, a light-absorbing member in which a light-absorbing film comprising a black paint containing carbon black and having a predetermined surface shape is provided on a surface of a substrate film is known (see Patent Literature 1).

Also, members having light-blocking properties are used in the shutters, diaphragm members, lens units, and the like of various optical apparatuses such as single-lens reflex cameras, compact cameras, and video cameras. Further, in these light-blocking members, excellent slip properties (sliding properties) and low gloss are also needed because of their modes of use. Conventionally, metal thin films to which black paints are applied have been used as the shutters, diaphragm members, lens units, and the like of various optical apparatuses. However, in recent years, replacement by lightweight plastic materials has been studied.

As such a nonmetallic light-blocking member, a light-blocking member in which light-blocking membranes containing carbon black and a lubricant in a thermosetting resin or a room temperature curable resin are formed on both surfaces of a resin film is known (see Patent Literature 2). A light-blocking membrane in which light-blocking membranes containing carbon black, a lubricant such as polyethylene wax, silica fine particles having an amount of oil absorbed of 250 (g/100 g) or more, and a binder resin are formed on both surfaces of a resin film is also known (see Patent Literature 3).

CITATION LIST

Patent Literature

Patent Literature 1: Japanese Patent Laid-Open No. 2003-266580
Patent Literature 2: Japanese Patent Laid-Open No. 04-009802
Patent Literature 3: International Publication No. WO 2006/016555

SUMMARY OF INVENTION

Technical Problem

However, as typified by, for example, smartphones and single-lens reflex cameras, the requirements of the miniaturization and thinning of various optical apparatuses increase much more. High optical density (OD) is also required of a light-blocking member, but in the conventional art, the optical density per predetermined thickness is not sufficient, and there is room for improvement.

Here, in order to increase the optical density per predetermined thickness, it is generally considered that a light-blocking filler such as carbon black should be highly filled. However, for example, in the conventional art, in a light-blocking member having an optical density of 5.4 or more, the total filling rate of fillers such as carbon black, a lubricant, and silica fine particles is already in a saturated state, and more highly filling the fillers reaches a technical limit. Therefore, when the optical density per predetermined thickness is increased, a search for a new design guide that replaces the conventional formulation design in which the filling ratio of carbon black is increased is needed.

The present invention has been made in view of the above problem. Specifically, it is an object of the present invention to provide a light-blocking member, a black resin composition, and a black resin molded article in which the optical density per predetermined thickness is increased.

Solution to Problem

The present inventors have studied diligently in order to solve the above problem. As a result, the present inventors have found that the above problem is solved by using two large and small black pigments as light-blocking fillers, arriving at the present invention.

Specifically, the present invention provides specific embodiments shown in the following (1) to (13).

(1) A light-blocking member comprising a substrate; and a light-blocking membrane (film) provided on at least one surface of the substrate, wherein the light-blocking membrane contains at least a binder resin and a black pigment, and the black pigment contains a first black pigment having an average particle diameter $D_{50}$ of 0.4 to 2.5 μm and a second black pigment having an average particle diameter $D_{50}$ smaller than the average particle diameter $D_{50}$ of the first black pigment.

(2) The light-blocking member according to above (1), wherein an optical density of the light-blocking membrane is 0.54 to 2.00 ($\mu m^{-1}$) in terms of thickness.

(3) The light-blocking member according to above (1) or (2), wherein the average particle diameter $D_{50}$ of the second black pigment is 0.01 to 0.3 μm.

(4) The light-blocking member according to any one of above (1) to (3), wherein the black pigment is contained in an amount of 10% by mass or more and 60% by mass or less in terms of solids based on all resin components contained in the light-blocking membrane.

(5) The light-blocking member according to any one of above (1) to (4), wherein the light-blocking membrane has a total thickness of 3 μm or more and less than 10 μm.

(6) The light-blocking member according to any one of above (1) to (5), wherein the binder resin comprises at least one selected from a group consisting of a thermoplastic resin, a thermosetting resin, a thermoplastic elastomer, a thermosetting elastomer, an ultraviolet curable resin, and an electron beam curable resin.

(7) The light-blocking member according to any one of above (1) to (6), wherein
the substrate is a sheet-shaped substrate, and
the light-blocking membranes are provided on one major surface and the other major surface of the sheet-shaped substrate.
(8) A black resin composition comprising at least a matrix resin and a black pigment dispersed in the matrix resin, wherein
the black pigment contains a first black pigment having an average particle diameter $D_{50}$ of 0.4 to 2.5 μm and a second black pigment having an average particle diameter $D_{50}$ smaller than the average particle diameter $D_{50}$ of the first black pigment.
(9) The black resin composition according to above (8), wherein
an optical density in terms of thickness when the black resin composition is molded is 0.54 to 2.00 ($μm^{-1}$).
(10) The black resin composition according to above (8) or (9), wherein
the average particle diameter $D_{50}$ of the second black pigment is 0.01 to 0.3 μm.
(11) The black resin composition according to any one of above (8) to (10), wherein
the black pigment is contained in an amount of 10% by mass or more and 60% by mass or less in terms of solids based on all resin components.
(12) The black resin composition according to any one of above (8) to (11), wherein
the matrix resin comprises at least one selected from a group consisting of a thermoplastic resin, a thermosetting resin, a thermoplastic elastomer, a thermosetting elastomer, an ultraviolet curable resin, and an electron beam curable resin.
(13) A black resin molded article obtained by molding the black resin composition according to any one of above (8) to (12).

In the present invention, by blending the two large and small black pigments having different average particle diameters $D_{50}$ in the resin, the optical density per predetermined thickness (ODt) is especially improved. The reason is not certain but is presumed to be that the voids between the particles of the first black pigment are filled with the second black pigment having a small average particle diameter $D_{50}$, and thus the particles of the black pigments are densely filled compared with the conventional design. However, the action is not limited to this. From the above features of the present invention, at least the following superiority is derived.

First of all, when the amount of the black pigment blended is the same, the optical density per predetermined thickness (ODt) is not sufficient in the conventional art, and therefore further miniaturization and/or film thinning cannot be pursued. This is due to the fact that the light-blocking properties as basic performance are not sufficient. On the other hand, in the present invention, the optical density per predetermined thickness (ODt) is especially improved, and therefore miniaturization and/or film thinning and high light-blocking properties can be balanced at a high level.

Secondly, when the optical density (OD) is the same, a light-blocking filler such as carbon black must be relatively highly blended in the conventional art. For example, in order to set the OD value at 6.0, the filling rate needs to be increased to a saturated state. With such a composition, there is little design flexibility for further improvement, and the process margin during manufacture is also narrow. On the other hand, in the present invention, a mode in which the amount of the black pigments blended is relatively small can be realized. It can also be said that in the mode in which the amount of the black pigments blended is relatively small in this manner, design flexibility for further improvement is sufficiently ensured. For example, a design change such as blending large amounts of other additives can be sufficiently made considering other required performance. In addition, in the mode in which the amount of fillers such as black pigments blended is relatively small, the dispersibility, the film-forming properties, and the handling properties are excellent, and the process margin during manufacture can be increased.

Further, in the present invention, a light-blocking member and the like not only having excellent light-blocking properties as described above but having low surface glossiness (excellent delustering properties) and excellent slip properties (sliding properties) can also be realized. This is presumed to be due to the fact that by blending the two large and small black pigments having different average particle diameters $D_{50}$ in the resin, fine irregularities formed by the black pigment having a small average particle diameter $D_{50}$ are superimposed on irregularities in the surface formed by the black pigment having a large average particle diameter $D_{50}$, and as a result the reflection of incident light decreases more. Thus, it is presumed that the glossiness (specular glossiness) of the surface decreases, and good delustering properties are exhibited when the light-blocking member is formed, and further, good sliding properties are obtained. However, the action is not limited to this.

Here, in the conventional formulation design, while the total filling rate of the fillers described above is already in the saturated state, the amount of carbon black blended, the amount of the matting agent blended, and the amount of the slipping agent blended are finely adjusted. This is because three types of performance, light-blocking properties, surface glossiness, and slip properties, are in a trade-off relationship. Specifically, by highly blending a filler such as carbon black, the slip properties can be increased, but at the same time the surface glossiness increases. On the other hand, a method of blending a matting agent (delusterant) in order to decrease surface glossiness is also known, but in this case, the slip properties tend to deteriorate, and further, due to decreases in the amounts of carbon black and the like blended, even light-blocking properties can be sacrificed. Further, blending a slipping agent in order to increase slip properties is also attempted, but since the total filling rate of the fillers described above is already in the saturated state, the amounts of other fillers such as carbon black blended need to be decreased for the blending of the slipping agent, and in this case, light-blocking properties as basic performance are sacrificed. In view of these technical backgrounds, the present invention has special technical significance in newly finding a novel formulation design that can eliminate the technical trade-off relationship, which cannot be eliminated by the conventional formulation design.

Advantageous Effects of Invention

According to the present invention, a light-blocking member, a black resin composition, and a black resin molded article in which the optical density per predetermined thickness (ODt) is increased, and the like can be provided. Thus, a light-blocking member that adapts to further miniaturization and/or film thinning while having light-blocking properties equal to or more than those of the conventional art can be realized. In addition, according to the present invention, a light-blocking member and the like not only having excellent light-blocking properties but having low surface glossiness and also excellent slip properties can also be realized. Further, according to the present invention, the dispersibility, film-forming properties, and handling properties during manufacture can be improved.

BRIEF DESCRIPTION OF DRAWING

FIG. 1 is a diagram schematically showing the main part of a light-blocking member 1 in a first embodiment.

DESCRIPTION OF EMBODIMENTS

Embodiments of the present invention will be described in detail below with reference to the drawing. Positional relationships such as top, bottom, left, and right are based on the positional relationships shown in the drawing unless otherwise noted. The dimensional ratio in the drawing is not limited to the ratio shown. However, the following embodiments are illustrations for explaining the present invention, and the present invention is not limited to these and can be carried out by making any changes without departing from the spirit thereof. As used herein, for example, the description of the numerical value range "1 to 100" encompasses both the upper limit value "1" and the lower limit value "100". The same applies to the description of other numerical value ranges.

FIG. 1 is a diagram schematically showing the main part of a light-blocking member 1 in the first embodiment of the present invention. The light-blocking member 1 in this embodiment comprises a substrate 2 and a light-blocking membrane 3 (a light-blocking film 3) provided on at least one surface of this substrate 2. The light-blocking membrane 3 contains at least a binder resin 31 and two black pigments 32 and 33 having different average particle diameters $D_{50}$.

The components of the light-blocking member 1 will be described in detail below.

The type of the substrate 2 is not particularly limited as long as it can support the light-blocking membrane 3. Specific examples of the substrate 2 include, but are not particularly limited to, paper, synthetic paper, metal sheets, alloy sheets, metal foil, synthetic resin films, and laminates thereof. The substrate 2 may or may not have adhesiveness to the light-blocking membrane 3. The substrate 2 having no adhesiveness to the light-blocking membrane 3 can be allowed to function as a release film. From the viewpoint of dimensional stability, mechanical strength, weight reduction, and the like, synthetic resin films are preferably used. Examples of the synthetic resin films include polyester films, ABS (acrylonitrile-butadiene-styrene) films, polyimide films, polystyrene films, and polycarbonate films. Acrylic, polyolefin-based, cellulosic, polysulfone-based, polyphenylene sulfide-based, polyethersulfone-based, and polyetheretherketone-based films can also be used. Among these, as the substrate 2, polyester films are preferably used. Especially, stretched, particularly biaxially stretched, polyester films have excellent mechanical strength and dimensional stability and therefore are particularly preferred. For heat-resistant applications, polyimide films are particularly preferred. Here, the appearance of the substrate 2 may be any of transparent, semitransparent, and opaque appearance and is not particularly limited. For example, foamed synthetic resin films such as foamed polyester films, and synthetic resin films in which black pigments such as carbon black and other pigments are contained can also be used. When being much thinner and high light-blocking properties are needed, the optical density of the entire light-blocking member 1 can also be reinforced by using the substrate 2 having high optical density.

The thickness of the substrate 2 can be appropriately set according to the required performance and the application and is not particularly limited. Generally, 1 µm or more and less than 250 µm is considered as a rough standard. Here, from the viewpoint of the strength and rigidity of the light-blocking member 1, and the like, 51 µm or more and less than 250 µm is preferred, and from the viewpoint of weight reduction and film thinning, 1 µm or more and 50 µm or less is preferred. In the light-blocking member 1 in this embodiment, the optical density in terms of thickness (ODt) of the light-blocking membrane 3 is especially increased, and therefore the light-blocking member 1 having, for example, a total thickness of 60 µm or less, preferably a total thickness of 35 µm or less, further preferably a total thickness of 15 µm or less, and particularly preferably a total thickness of 10 µm or less can be realized while various types of performance such as light-blocking properties are maintained even if both the substrate 2 and the light-blocking membrane 3 are set as thin films. Therefore, in applications where film thinning is particularly required, the thickness of the substrate 2 is more preferably 1 µm or more and 25 µm or less, further preferably 4 µm or more and 10 µm or less, and particularly preferably 5 µm or more and 7 µm or less. From the viewpoint of improving adhesiveness to the light-blocking membrane 3, the surface of the substrate 2 can also be subjected to various known surface treatments such as anchor treatment and corona treatment as needed.

The light-blocking membrane 3 is provided on at least one surface of the above-described substrate 2 and contains at least the binder resin 31 and the black pigments 32 and 33. In FIG. 1, a mode in which the light-blocking membrane 3 is provided on only one major surface (upper surface) of the sheet-shaped substrate 2 is shown, but the light-blocking membranes 3 may be provided on one major surface (upper surface) of and the other major surface (lower surface) of the sheet-shaped substrate 2 respectively. By providing the light-blocking membranes 3 on both the upper surface and lower surface of the sheet-shaped substrate 2, the handling properties of the light-blocking member 1 are increased.

Examples of the binder resin 31 used here include, but are not particularly limited to, thermoplastic resins or thermosetting resins such as poly(meth)acrylic acid-based resins, polyester-based resins, polyvinyl acetate-based resins, polyvinyl chloride-based resins, polyvinyl butyral-based resins, cellulosic resins, polystyrene/polybutadiene resins, polyurethane-based resins, alkyd resins, acrylic resins, unsaturated polyester-based resins, epoxy ester-based resins, epoxy-based resins, epoxy acrylate-based resins, urethane acrylate-based resins, polyester acrylate-based resins, polyether acrylate-based resins, phenolic resins, melamine-based resins, urea-based resins, and diallyl phthalate-based resins. Thermoplastic elastomers, thermosetting elastomers, ultraviolet curable resins, electron beam curable resins, and the like can also be used. One of these can be used alone, and two or more of these can also be used in combination. The binder resin can be appropriately selected and used according to the required performance and the application. For example, in applications where heat resistance is required, thermosetting resins are preferred.

The content of the binder resin 31 in the light-blocking membrane 3 is not particularly limited but is preferably 40 to 90% by mass, more preferably 50 to 85% by mass, and further preferably 60 to 80% by mass in terms of solids based on the total amount of the light-blocking membrane 3. By setting the content of the binder resin 31 in the above preferred range, physical properties such as the adhesiveness between the substrate 1 and the light-blocking membrane 3 and the light-blocking properties, sliding properties, and delustering properties of the light-blocking membrane 3 can be balanced at a high level. In addition, it is also possible to improve the scratch resistance of the formed light-blocking membrane 3 and prevent the light-blocking membrane 3 from becoming brittle. Particularly in this embodiment, a mode in which the amount of the black pigments blended is relatively small can be realized as described later, and therefore the content of the binder resin 31 can be relatively more increased (for example, 65% by mass or more) than in the conventional art, which as a result can contribute to the improvement of the dispersibility of the black pigments, the film-forming properties, handling properties, adhesiveness, slip properties, and abrasion resistance of the light-blocking membrane 3, and the like.

On the other hand, the black pigments 32 and 33 contained in the light-blocking membrane 3 color the binder resin 31 black to provide light-blocking properties. In this embodiment, as the black pigments 32 and 33 contained in the light-blocking membrane 3, two black pigments having different average particle diameters $D_{50}$, that is, a first black pigment 32 having an average particle diameter $D_{50}$ of 0.4 to 2.5 μm and a second black pigment 33 having an average particle diameter $D_{50}$ smaller than the average particle diameter $D_{50}$ of this first black pigment, are used.

Examples of the black pigments used here include, but are not particularly limited to, black resin particles, titanium black, magnetite-based black, copper-iron-manganese-based black, titanium black, and carbon black. Among these, black resin particles, titanium black, and carbon black are preferred because of excellent concealing properties, and carbon black is more preferred. As the carbon black, conductive carbon black is particularly preferably used from the viewpoint of providing conductivity to the light-blocking membrane 3 to prevent electrostatic charging. The history of carbon black is old, and various grades of carbon black simple substances and carbon black dispersions are commercially available from, for example, Mitsubishi Chemical Corporation, Asahi Carbon Co., Ltd., MIKUNI COLOR LTD., RESINO COLOR INDUSTRY CO., LTD., Cabot, and DEGUSSA. The carbon black should be appropriately selected from among these according to the required performance and the application.

The first black pigment 32 has an average particle diameter $D_{50}$ of 0.4 to 2.5 μm, and the second black pigment 33 has an average particle diameter $D_{50}$ smaller than the first black pigment 32. By using two large and small black pigments 32 and 33 in this manner, the voids between the particles of the first black pigment 32 are densely filled with the second black pigment 33, and the light-blocking membrane 3 having a high optical density in terms of thickness (ODt) is realized. Here, the average particle diameter $D_{50}$ of the first black pigment 32 is more preferably 0.5 to 1.5 μm from the viewpoint of keeping surface glossiness low, improving slip properties, and the like. The average particle diameter $D_{50}$ of the second black pigment 33 is preferably 0.01 to 0.3 μm, more preferably 0.08 to 0.2 μm, from the viewpoint of obtaining dispersibility and sufficient light-blocking properties, and the like. The average particle diameter herein means a median diameter ($D_{50}$) measured by a laser diffraction particle size distribution measuring apparatus (for example, SHIMADZU CORPORATION: SALD-7000).

The content of the first black pigment 32 and the second black pigment 33 is not particularly limited but is preferably 20:80 to 95:5, more preferably 30:70 to 80:20, and further preferably 40:60 to 70:30 in a mass ratio in terms of solids from the viewpoint of the balance of light-blocking properties, surface glossiness, and slip properties. The light-blocking membrane 3 may contain a black pigment other than the above-described first and second black pigments 32 and 33.

The content of all black pigments in the light-blocking membrane 3 is not particularly limited but is preferably 10% by mass or more and 60% by mass or less, more preferably 15% by mass or more and 50% by mass or less, and further preferably 20% by mass or more and 40% by mass or less in terms of solids based on all resin components contained in the light-blocking membrane 3 (phr) from the viewpoint of dispersibility, the film-forming properties, handling properties, adhesiveness, slip properties, delustering properties, and abrasion resistance of the light-blocking membrane 3, and the like.

The thickness of the light-blocking membrane 3 can be appropriately set according to the required performance and the application and is not particularly limited. In applications where thickness is allowed, the thickness of the light-blocking membrane 3 should be sufficient, and thus the light-blocking membrane 3 in which the content of all black pigments in the light-blocking membrane 3 is significantly reduced can be realized. In such applications, the total thickness of the light-blocking membrane 3 is preferably 10 μm or more and 60 μm or less, more preferably 10 μm or more and 40 m or less. On the other hand, in applications where particularly film thinning is required, the total thickness of the light-blocking membrane 3 is preferably 3 μm or more and less than 10 μm, more preferably 4 μm or more and 9 μm or less, and further preferably 5 μm or more and 8 μm or less. The light-blocking membrane 3 in this embodiment has a very high optical density in terms of thickness (ODt) compared with that of conventional ones, and therefore film thinning, which is conventionally difficult, can be realized while optical density equal to or more than that of conventional ones is maintained. Here, the total thickness of the light-blocking membrane 3 means, when the light-blocking membrane 3 is provided on only one major surface of the substrate 2, the thickness of the light-blocking membrane 3 and means, when the light-blocking membranes 3 are provided on both surfaces (one major surface and the other major surface) of the substrate 2, a value obtained by adding the thicknesses of the light-blocking membranes 3 on both surfaces.

Here, the light-blocking membrane 3 preferably has an optical density in terms of thickness (ODt) of 0.54 to 2.00 ($μm^{-1}$), more preferably 0.55 to 2.00 ($μm^{-1}$), further preferably 0.80 to 1.80 ($μm^{-1}$), particularly preferably 0.90 to 1.50 ($μm^{-1}$), especially preferably 0.91 to 1.40 ($μm^{-1}$), and most preferably 0.92 to 1.20 ($μm^{-1}$). When the optical density in terms of thickness (ODt) is in the above preferred range, the light-blocking membrane 3 that is highly thinned while having sufficient optical density (OD) can be realized.

The light-blocking membrane 3 preferably has a surface glossiness of 5.0% or less. When the surface glossiness is low in this manner, the reflection of incident light decreases, and the delustering properties when the light-blocking member is formed tend to improve to increase light absorption properties. The surface glossiness of the light-blocking membrane 3 is more preferably 4.0% or less.

The light-blocking membrane 3 may contain a lubricant in addition to the binder resin 31 and the first and second black pigments 32 and 33 described above. By containing the lubricant, the slip properties (sliding properties) of the surface of the light-blocking membrane 3 improve, and the frictional resistance during operation decreases when it is processed into the shutter, diaphragm member, lens unit, or the like of an optical apparatus, and the abrasion resistance of the surface can be improved. As this lubricant, organic lubricants and inorganic lubricants known as known particulate lubricants can be used. Among these, liquid lubricants are preferred. Specific examples include, but are not particularly limited to, hydrocarbon-based lubricants such as polyethylene, paraffins, and waxes; fatty acid-based lubricants such as stearic acid and 12-hydroxystearic acid; amide-based lubricants such as stearic acid amide, oleic acid amide, and erucic acid amide; ester-based lubricants such as butyl stearate and monoglyceryl stearate; alcohol-based lubricants; solid lubricants such as metal soaps, talc, and molybdenum disulfide; silicone resin particles, polytetrafluoroethylene waxes, fluororesin particles such as polyvinylidene fluoride; crosslinked polymethyl methacrylate particles, and crosslinked polystyrene particles. Among these, particularly organic lubricants are preferably used. One of these can be used alone, and two or more of these can also be used in combination.

The content of the lubricant is not particularly limited but is generally preferably 0.5 to 10% by mass in terms of solids based on all resin components contained in the light-blocking membrane 3. In this embodiment, the fact that the light-blocking membrane 3 comprises substantially no lubricant is also one of preferred modes. By providing a lubricantless mode in this manner, the relative content of the binder resin 31 and the black pigments 32 and 33 in the light-blocking membrane 3 can be increased. This can suppress decreases in light-blocking properties and conductivity and slip properties and further can also contribute to the improvement of the adhesiveness, abrasion resistance, and the like of the light-blocking membrane 3. Comprising substantially no lubricant means that the content of the lubricant is less than 0.5% by mass in terms of solids based on all resin components contained in the light-blocking membrane 3, and the content of the lubricant is more preferably less than 0.1% by mass.

The light-blocking membrane 3 may contain a matting agent (delusterant). By containing the matting agent, the glossiness (specular glossiness) of the surface of the light-blocking membrane 3 can be decreased, and the light-blocking properties can be improved. As this matting agent, known ones can be used. Specific examples include, but are not particularly limited to, organic fine particles such as crosslinked acrylic beads, and inorganic fine particles such as silica, magnesium aluminometasilicate, and titanium oxide. Among these, silica is preferred from the viewpoint of dispersibility, cost, and the like. One of these can be used alone, and two or more of these can also be used in combination.

The content of the matting agent is not particularly limited but is generally preferably 0.5 to 20% by mass in terms of solids based on all resin components contained in the light-blocking membrane 3. In this embodiment, the fact that the light-blocking membrane 3 comprises substantially no matting agent is also one of preferred modes. Providing a matting-agent-less mode in this manner can increase the relative content of the binder resin 31 and the black pigments 32 and 33 in the light-blocking membrane 3, can suppress decreases in light-blocking properties and conductivity and slip properties, and further can also contribute to the improvement of the adhesiveness, abrasion resistance, and the like of the light-blocking membrane 3. Comprising substantially no matting agent means that the content of the matting agent is less than 0.5% by mass in terms of solids based on all resin components contained in the light-blocking membrane 3, and the content of the matting agent is more preferably less than 0.1% by mass.

The light-blocking membrane 3 may further contain other components. Examples of these other components include, but are not particularly limited to, conductive agents such as $SnO_2$, flame retardants, antimicrobial agents, fungicides, antioxidants, plasticizers, leveling agents, flow-adjusting agents, antifoaming agents, and dispersing agents. When an ultraviolet curable resin or an electron beam curable resin is used as the binder resin 31, for example, a sensitizer such as n-butylamine, triethylamine, or tri-n-butylphosphine, and an ultraviolet absorbing agent may be used.

The method for manufacturing the light-blocking member 1 in this embodiment is not particularly limited as long as the light-blocking member having the above-described configuration and composition is obtained. From the viewpoint of manufacturing the light-blocking member 1 with good reproducibility, simply, and at low cost, conventionally known application methods such as doctor coating, dip coating, roll coating, bar coating, die coating, blade coating, air knife coating, kiss coating, spray coating, and spin coating are preferably used. For example, the light-blocking member 1 in this embodiment can be obtained by applying an application liquid for a light-blocking membrane, which contains, in a solvent, the binder resin 31 the first and second black pigments 32 and 33 described above, and optional components (a lubricant, a matting agent, other components, and the like) blended as needed, to one surface or both surfaces of the substrate 2, drying the application liquid, and then performing heat treatment, pressurization treatment, and the like as needed, to form the light-blocking membrane 3 on the substrate 2. As the solvent of the application liquid used here, water; ketone-based solvents such as methyl ethyl ketone, methyl isobutyl ketone, and cyclohexanone; ester-based solvents such as methyl acetate, ethyl acetate, and butyl acetate; ether-based solvents such as methyl cellosolve and ethyl cellosolve; alcohol-based solvents such as methyl alcohol, ethyl alcohol, and isopropyl alcohol, and mixed solvents thereof, and the like can be used. In addition, in order to improve the adhesion between the substrate 2 and the light-blocking membrane 3, the surface of the substrate 2 can also be subjected to anchor treatment, corona treatment, and the like as needed. Further, an intermediate layer such as an adhesion layer can also be provided between the substrate 2 and the light-blocking membrane 3 as needed.

The light-blocking member 1 in this embodiment preferably has an optical density (OD) of 5.4 to 6.0, more preferably 5.5 to 6.0, from the viewpoint of being adaptable to further film thinning and having sufficient light-blocking properties. As used herein, the optical density (OD) is a value measured under conditions described in Examples described later.

As described in detail above, in the light-blocking member 1 in this embodiment, the optical density per predetermined thickness (ODt) is especially improved, and therefore the light-blocking member 1 in this embodiment can adapt to further miniaturization and/or film thinning without the light-blocking properties being excessively impaired. Therefore, the light-blocking member 1 in this embodiment can be preferably used as a high-performance light-blocking member in the precision machine field, the semiconductor field, the optical apparatus field, and the like where lightness, thinness, shortness, and smallness are required. In addition, one having low surface glossiness and also excellent slip properties can also be realized, and therefore the light-blocking member 1 in this embodiment can be especially preferably used as a light-blocking member for an optical apparatus such as a high-performance single-lens reflex camera, a compact camera, a video camera, a cellular phone, or a projector, for example, a shutter or a diaphragm member such as a shutter, a diaphragm member, or a lens unit.

In the above embodiment, a mode in which the light-blocking membrane 3 is provided on the substrate 2 is shown, but the present invention can also be carried out in a mode in which the substrate 2 is omitted. For example, the present invention can be effectively carried out as a resin composition (black resin composition) containing at least a matrix resin and a black pigment dispersed in this matrix resin, the resin composition containing as the black pigment a first black pigment having an average particle diameter $D_{50}$ of 0.4 to 2.5 μm and a second black pigment having an average particle diameter $D_{50}$ smaller than the average particle diameter $D_{50}$ of this first black pigment. As the matrix resin used here, the same as those described for the binder resin 31 in the above first embodiment can be used. As the first and second black pigments used here, the same as those described for the first and second black pigments 32 and 33 in the above first embodiment can be used. This black resin composition has the same composition as the light-blocking membrane 3 described in the above embodiment, and therefore an optical density in terms of thickness of 0.54 to 2.00 ($\mu m^{-1}$) when the black resin composition is molded can be realized. Therefore, by molding the black resin composition by various known molding methods such as heat molding, compression molding, injection molding, blow molding, transfer molding, and extrusion molding, a molded article (black resin molded article) in which the optical density per predetermined thickness (ODt) is especially improved can be obtained. After the black resin composition is once molded into a sheet shape, vacuum forming, pressure forming, or the like can also be performed.

EXAMPLES

The present invention will be described in detail below by giving Examples and Comparative Examples, but the present invention is not limited in any way by these Examples. The present invention can employ various conditions as long as the object of the present invention is achieved without departing from the spirit of the present invention. "Parts" indicates "parts by mass" and "phr" indicates "% by mass in terms of solids based on all resin components" contained in a light-blocking membrane unless otherwise noted below.

Example 1

The application liquid for a light-blocking membrane E1 set forth below was applied to each of both surfaces of a polyester film having a thickness of 6 μm (K200: Mitsubishi Polyester Film Corporation) as a substrate by a bar coating method so that the thickness after drying was 3 μm, and dried to form a light-blocking membrane having a thickness of 3 μm on each of both surfaces of the substrate to fabricate a light-blocking member for an optical apparatus in Example 1.

<Application Liquid for Light-Blocking Membrane E1>

| | |
|---|---|
| Acrylic polyol (ACRYDIC A801P: manufactured by Dainippon Ink and Chemicals, Incorporated, solids: 50%) | 100 parts by mass |
| Isocyanate (TAKENATE D110N: manufactured by Mitsui Chemicals Polyurethanes, Inc., solids: 60%) | 25.0 parts by mass |
| First black pigment (Conductive carbon black SD-TT2003: manufactured by RESINO COLOR INDUSTRY CO., LTD., average particle diameter 0.6 μm) | 20.1 phr |
| Second black pigment (Conductive carbon black #273: manufactured by MIKUNI COLOR LTD., average particle diameter 0.15 μm) | 19.9 phr |
| Leveling agent (Silicone-based additive M-ADDITIVE: manufactured by Dow Corning Toray Co., Ltd.) | 0.05% by mass based on the total amount of solids |
| Diluting solvent (Mixed solvent of MEK:toluene:butyl acetate = 4:3:3) | 100 parts by mass |

Reference Example 1

Operation was performed as in Example 1 except that the application liquid for a light-blocking membrane RE1 set forth below was used instead of the application liquid for a light-blocking membrane E1, applied so that the thickness after drying was 5 μm, and dried. Thus, a light-blocking member for an optical apparatus in Reference Example 1 was fabricated.

<Application Liquid for Light-Blocking Membrane RE1>

| | |
|---|---|
| Acrylic polyol (ACRYDIC A801P: manufactured by Dainippon Ink and Chemicals, Incorporated, solids: 50%) | 100 parts by mass |
| Isocyanate (TAKENATE D110N: manufactured by Mitsui Chemicals Polyurethanes, Inc., solids: 60%) | 22.7 parts by mass |
| Conductive nanoparticle carbon black (Vulcan XC-72R: manufactured by Cabot, average primary particle diameter 30 nm, aggregated particle diameter 4.0 μm) | 23.16 phr |
| Matting agent (Silica fine particles Acematt_TS100: manufactured by EVONIK, average particle diameter 10 μm) | 5.6 phr |
| Leveling agent (Silicone-based additive M-ADDITIVE: manufactured by Dow Corning Toray Co., Ltd.) | 0.05% by mass based on the total amount of solids |
| Diluting solvent (Mixed solvent of MEK:toluene:butyl acetate = 4:3:3) | 100 parts by mass |

Comparative Example 1

Operation was performed as in Example 1 except using an application liquid for a light-blocking membrane CE1 in which in the application liquid for a light-blocking membrane E1, the blending of the first carbon black and the second carbon black was omitted, and 40.0 phr of the conductive carbon black used in Reference Example 1 was blended. Thus, a light-blocking member for an optical apparatus in Comparative Example 1 was fabricated.

Comparative Example 2

Operation was performed as in Comparative Example 1 except using an application liquid for a light-blocking membrane CE2 in which 5.6 phr of the matting agent used in Reference Example 1 was blended into the application liquid for a light-blocking membrane CE1. Thus, a light-blocking member for an optical apparatus in Comparative Example 2 was fabricated.

Comparative Example 3

Operation was performed as in Example 1 except using an application liquid for a light-blocking membrane CE3 in which in the application liquid for a light-blocking membrane E1, the blending of the second carbon black was omitted, and the amount of the first carbon black blended was changed to 40.0 phr. Thus, a light-blocking member for an optical apparatus in Comparative Example 3 was fabricated.

Comparative Example 4

Operation was performed as in Comparative Example 3 except using an application liquid for a light-blocking membrane CE4 in which 5.6 phr of the matting agent used in Reference Example 1 was blended into the application liquid for a light-blocking membrane CE3. Thus, a light-blocking member for an optical apparatus in Comparative Example 4 was fabricated.

Comparative Example 5

Operation was performed as in Example 1 except using an application liquid for a light-blocking membrane CE5 in which in the application liquid for a light-blocking membrane E1, the blending of the first carbon black was omitted, and the amount of the second carbon black blended was changed to 40.0 phr. Thus, a light-blocking member for an optical apparatus in Comparative Example 5 was fabricated.

Comparative Example 6

Operation was performed as in Comparative Example 5 except using an application liquid for a light-blocking membrane CE6 in which 5.6 phr of the matting agent used in Reference Example 1 was blended into the application liquid for a light-blocking membrane CE5. Thus, a light-blocking member for an optical apparatus in Comparative Example 6 was fabricated.

For the light-blocking members for optical apparatuses in Example 1, Reference Example 1, and Comparative Examples 1 to 6 obtained, the measurement and evaluation of physical properties were performed under the following conditions. The evaluation results are shown in Table 1.

(1) Optical Density OD

For the measurement of optical density, the optical density was measured based on JIS-K7651: 1988 using an optical densitometer (TD-904: GretagMacbeth). In the measurement, a UV filter was used.

(2) Optical Density in Terms of Thickness ODt

Optical density was divided by film thickness to calculate optical density per thickness of 1 μm ODt ($\mu m^{-1}$).

(3) Surface Glossiness

The surface glossiness (specular glossiness) (%) of the light-blocking membrane surface at incidence and acceptance angles of 60° was measured in accordance with JIS-Z8741: 1997 using a digital variable angle glossmeter (UGV-5K: Suga Test Instruments Co., Ltd.). It is noted that the lower the glossiness is, the better the delustering properties are.

(4) Evaluation of Slip Properties

The static friction coefficient (s) and kinetic friction coefficient (k) of the light-blocking membrane were measured under the conditions of a load of 200 (g) and a speed of 100 (mm/min) in accordance with JIS-K7125: 1999, and each was evaluated according to the following criteria.

Static Friction Coefficient ($\mu s$)
less than 0.30 ⊚
0.30 or more and less than 0.35 ○
0.35 or more and less than 0.40 Δ
0.40 or more x Kinetic friction coefficient ($\mu k$)
0.30 or more and less than 0.35 ⊚
0.35 or more and less than 0.40 ○
0.40 or more x

TABLE 1

| | Carbon black | | Matting agent | thickness (μm) | Optical density | Optical density in terms of thickness ($\mu m^{-1}$) | Surface glossiness (%) | Slip properties | |
|---|---|---|---|---|---|---|---|---|---|
| | | Content (phr) | | | | | | Static friction | Kinetic friction |
| Example 1 | Two types | 40.0 | — | 3 | 6.0 | 1.00 | 3.0 | ⊚ | ⊚ |
| Reference Example 1 | One type | 23.2 | Silica | 5 | 5.1 | 0.51 | 3.0 | Δ | X |
| Comparative Example 1 | One type | 40.0 | — | 3 | 5.3 | 0.88 | 10.0 | ⊚ | ⊚ |
| Comparative Example 2 | One type | 40.0 | Silica | 3 | 5.5 | 0.92 | 2.5 | Δ | X |
| Comparative Example 3 | One type | 40.0 | — | 3 | 5.0 | 0.83 | 8.0-10.0 | ⊚ | ⊚ |
| Comparative Example 4 | One type | 40.0 | Silica | 3 | 5.1 | 0.85 | 2.1 | Δ | X |
| Comparative Example 5 | One type | 40.0 | — | 3 | 6.0 | 1.00 | 25-30 | ⊚ | ○ |
| Comparative Example 6 | One type | 40.0 | Silica | 3 | 6.0 | 1.00 | 5.0 | Δ | X |

As shown in Table 1, in the light-blocking member for an optical apparatus in Reference Example 1 having a conventionally formulation, the optical density in terms of thickness (ODt) of the light-blocking membrane is as low as 0.51, and the total thickness is 10 μm (5 μm on one surface) in order to realize a light-blocking membrane having an optical density of 5 or more, and the light-blocking properties as basic performance are insufficient. In addition, due to the matting agent blended for keeping surface glossiness low, the slip properties are also poor.

On the other hand, in the light-blocking member for an optical apparatus in Comparative Example 1 in which carbon black is highly filled in order to improve the optical density OD, an optical density of 5.5 is achieved with a total thickness of 6 μm (3 μm on one surface), but the optical density in terms of thickness (ODt) is 0.88, and therefore the light-blocking properties as basic performance are not sufficient. In addition, as the carbon black is highly filled, the surface glossiness deteriorates. One in which a matting agent is further blended in order to improve this deterioration of surface glossiness is Comparative Example 2. In the light-blocking member for an optical apparatus in this Comparative Example 2, due to the blending of the matting agent, the surface glossiness can be kept low, but on the other hand the slip properties are greatly impaired.

In addition, in Comparative Examples 3 and 4, carbon black having a larger average particle diameter than the carbon black used in Comparative Examples 1 and 2 is used. In the light-blocking members for optical apparatuses in these Comparative Examples 3 and 4, the optical density in terms of thickness (ODt) is still low, and the light-blocking properties as basic performance cannot be said to be sufficient. In addition, in the light-blocking member for an optical apparatus in Comparative Example 3, as the carbon black is highly filled, the surface glossiness deteriorates. One in which a matting agent is further blended in order to improve this deterioration of surface glossiness is Comparative Example 4. In the light-blocking member for an optical apparatus in this Comparative Example 4, due to the blending of the matting agent, the surface glossiness can be kept low, but on the other hand the slip properties are greatly impaired.

Further, in Comparative Examples 5 and 6, carbon black having a smaller average particle diameter than the carbon black used in Comparative Examples 1 and 2 is used. It is seen that in the light-blocking members for optical apparatuses in these Comparative Examples 5 and 6, the optical density in terms of thickness (ODt) is high, and the light-blocking properties are excellent. However, in the light-blocking member for an optical apparatus in Comparative Example 5, as the carbon black is highly filled, the surface glossiness deteriorates significantly. One in which a matting agent is further blended in order to improve this deterioration of surface glossiness is Comparative Example 6. In the light-blocking member for an optical apparatus in this Comparative Example 6, due to the blending of the matting agent, the surface glossiness can be kept low, but on the other hand the slip properties are greatly impaired.

In contrast to this, in the light-blocking member for an optical apparatus in Example 1 of the present invention, the optical density in terms of thickness (ODt) of the light-blocking membrane is high, and the light-blocking member for an optical apparatus adapts to film thinning, and at the same time the performance of light-blocking properties, surface glossiness, and slip properties is achieved at a high level. Especially, as supported by Comparative Examples 1 to 6, in the conventional art, the use of a matting agent is essential for setting surface glossiness at 5.0 or less, but in the light-blocking member for an optical apparatus in Example 1 of the present invention, a surface glossiness of 3.0 is achieved without using a matting agent.

Example 2

The following application liquid for a light-blocking membrane E2 was applied to each of both surfaces of a polyester film having a thickness of 6 μm (K200: Mitsubishi Polyester Film Corporation) as a substrate by a bar coating method so that the thickness after drying was 3 μm, and dried. Then, heat treatment at 150° C. was performed using a circulating hot air dryer, and then UV irradiation treatment (accumulated amount of light: 1000 mJ/cm$^2$) was performed using a high pressure mercury lamp, to form a light-blocking membrane having a thickness of 3 μm on each of both surfaces of the substrate to fabricate a light-blocking member for an optical apparatus in Example 2.

<Application Liquid for Light-Blocking Membrane E2>

| | |
|---|---|
| Urethane acrylate (Resin 1700BA: manufactured by The Nippon Synthetic Chemical Industry Co., Ltd., solids: 90%) | 100 parts by mass |
| First black pigment (Conductive carbon black SD-TT2003: manufactured by RESINO COLOR INDUSTRY CO., LTD., average particle diameter 0.6 μm) | 7.6 phr |
| Second black pigment (Conductive carbon black #273: manufactured by MIKUNI COLOR LTD., average particle diameter 0.15 μm) | 7.4 phr |
| Leveling agent (Silicone-based additive M-ADDITIVE: manufactured by Dow Corning Toray Co., Ltd.) | 0.2 parts by mass |
| Azo polymerization initiator | 5.0 parts by mass |
| Oxime ester-based photopolymerization initiator | 3.0 parts by mass |
| Diluting solvent (Mixed solvent of MEK:butyl acetate = 54:46) | 100 parts by mass |

Example 3

Operation was performed as in Example 2 except that in the application liquid for a light-blocking membrane E2, the amounts of the first and second carbon blacks blended were changed to 10.1 phr and 9.9 phr respectively. Thus, a light-blocking member for an optical apparatus in Example 3 was fabricated.

Example 4

Operation was performed as in Example 2 except that in the application liquid for a light-blocking membrane E2, the amounts of the first and second carbon blacks blended were changed to 15.1 phr and 14.9 phr respectively. Thus, a light-blocking member for an optical apparatus in Example 4 was fabricated.

For the light-blocking members for optical apparatuses in Examples 2 to 4 obtained, the measurement and evaluation of physical properties were performed under the above-described conditions. The evaluation results are shown in Table 2.

TABLE 2

| | Carbon black | | Matting agent | thickness (μm) | Optical density | Optical density in terms of thickness (μm$^{-1}$) | Surface glossiness (%) | Slip properties | |
|---|---|---|---|---|---|---|---|---|---|
| | Blending ratio | Content (phr) | | | | | | Static friction | Kinetic friction |
| Example 2 | 5:5 | 15.0 | — | 3 | 5.5 | 0.92 | 3.0 | ◎ | ◎ |
| Example 3 | 5:5 | 20.0 | — | 3 | 6.0 | 1.00 | 2.8 | ◎ | ◎ |
| Example 4 | 5:5 | 30.0 | — | 3 | 6.0 | 1.00 | 2.5 | ◎ | ◎ |

As shown in Table 2, in the light-blocking members for optical apparatuses in Examples 2 to 4 of the present invention, the optical density in terms of thickness (ODt) of the light-blocking membrane is high, and the light-blocking members for optical apparatuses adapt to film thinning, and at the same time the performance of light-blocking properties, surface glossiness, and slip properties is achieved at a high level. In addition, in the light-blocking member for an optical apparatus in Example 2 of the present invention, an optical density in terms of thickness (ODt) of 0.92 is achieved with an amount of carbon black filled of 15 phr. Further, in the light-blocking members for optical apparatuses in Examples 3 and 4 of the present invention, an optical density in terms of thickness (ODt) of 1.00 is achieved with an amount of carbon black filled of 20 phr or more. When these are compared with Comparative Examples 1 to 6, it is understood that in the light-blocking members for optical apparatuses in Examples 2 to 4 of the present invention, although the amount of carbon black used is reduced by 50% or more, excellent light-blocking properties can be realized. In addition, the use of a matting agent is conventionally essential for setting surface glossiness at 5.0 or less, but in the light-blocking members for optical apparatuses in Examples 2 to 4 of the present invention, a surface glossiness of 2.5 to 3.0 is achieved without using a matting agent.

Example 5

Operation was performed as in Example 1 except that the blending ratio between the first black pigment and the second black pigment was 3:7, and the total amount of these was 40 phr. Thus, a light-blocking member for an optical apparatus in Example 5 was fabricated.

Example 6

Operation was performed as in Example 1 except that the blending ratio between the first black pigment and the second black pigment was 7:3, and the total amount of these was 40 phr. Thus, a light-blocking member for an optical apparatus in Example 6 was fabricated.

Example 7

Operation was performed as in Example 1 except that the blending ratio between the first black pigment and the second black pigment was 4:6, and the total amount of these was 30 phr. Thus, a light-blocking member for an optical apparatus in Example 7 was fabricated.

Example 8

Operation was performed as in Example 1 except that the blending ratio between the first black pigment and the second black pigment was 8:2, the total amount of these was 60 phr, and a light-blocking membrane having a thickness of 2 μm was formed on each of both surfaces of the substrate. Thus, a light-blocking member for an optical apparatus in Example 8 was fabricated.

For the light-blocking members for optical apparatuses in Examples 5 to 8 obtained, the measurement and evaluation of physical properties were performed under the above-described conditions. The evaluation results are shown in Table 3.

TABLE 3

| | Carbon black | | Matting agent | thickness (μm) | Optical density | Optical density in terms of thickness (μm$^{-1}$) | Surface glossiness (%) | Slip properties | |
|---|---|---|---|---|---|---|---|---|---|
| | Blending ratio | Content (phr) | | | | | | Static friction | Kinetic friction |
| Example 5 | 3:7 | 40.0 | — | 3 | 6.0 | 1.00 | 3.0 | ◎ | ◎ |
| Example 6 | 7:3 | 40.0 | — | 3 | 6.0 | 1.00 | 2.5 | ◎ | ◎ |
| Example 7 | 4:6 | 30.0 | — | 3 | 6.0 | 1.00 | 3.0 | ◎ | ◎ |
| Example 8 | 8:2 | 60.0 | — | 2 | 6.0 | 1.50 | 2.0 | ○ | ○ |

As shown in Table 3, in the light-blocking members for optical apparatuses in Examples 5 to 8 of the present invention, the optical density in terms of thickness (ODt) of the light-blocking membrane is high, and the light-blocking members for optical apparatuses adapt to film thinning, and at the same time the performance of light-blocking properties, surface glossiness, and slip properties is achieved at a high level. Especially, in the light-blocking member for an optical apparatus in Example 8 of the present invention, an optical density in terms of thickness (ODt) of 1.50 is achieved, and an optical density (OD) of 6.0 is achieved with a total film thickness of 4 μm (2 μm on one surface×2), and not only are the light-blocking properties excellent, but especially significant film thinning is achieved.

From the above, it was confirmed that the light-blocking member for an optical apparatus according to the present invention could adapt to a variety of optical apparatuses in which the degree of light-blocking properties required was different by the adjustment of the amount of the black pigments filled in the light-blocking membrane, its thickness, and the like. In addition, it was confirmed that a relatively small amount of the black pigments filled was needed, and therefore the light-blocking member for an optical apparatus according to the present invention had high design flexibility in which the blending of other components was possible. Moreover, the light-blocking properties, basic performance, are especially excellent, and therefore adaptation to further film thinning is also possible.

INDUSTRIAL APPLICABILITY

The present invention can be widely and effectively utilized as a high-performance light-blocking member in the precision machine field, the semiconductor field, the optical apparatus field, and the like where lightness, thinness, shortness, and smallness are required. In addition, one having low surface glossiness and also excellent slip properties can also be realized, and therefore the present invention can be especially effectively utilized as a light-blocking member for an inner wall surface or the like for an optical apparatus such as a high-performance single-lens reflex camera, a compact camera, a video camera, a cellular phone, or a projector, and as, for example, a shutter, a diaphragm member, or a lens unit.

REFERENCE SIGNS LIST

1 Light-blocking member
2 Substrate
3 Light-blocking membrane
31 Binder resin
32 First carbon black
33 Second carbon black

The invention claimed is:

1. A light-blocking member comprising a substrate; and a light-blocking membrane provided on at least one surface of the substrate, wherein
the light-blocking membrane comprises at least a binder resin and a black pigment,
the black pigment is contained in an amount of 10% by mass or more and 40% by mass or less in terms of solids based on all resin components contained in the light-blocking membrane,
the black pigment contains a first black pigment having an average particle diameter $D_{50}$ of 0.5 to 2.5 μm and a second black pigment having an average particle diameter $D_{50}$ smaller than the average particle diameter $D_{50}$ of the first black pigment wherein the content of the first black pigment and the second black pigment is 30:70 to 80:20 in a mass ratio in terms of solids;
the average particle diameter $D_{50}$ of the second black pigment is 0.08 to 0.3 μm,
the binder resin comprises at least one selected from a group consisting of a thermosetting resin, a thermosetting elastomer, an ultraviolet curable resin, and an electron beam curable resin,
the first and second black pigments are carbon black,
the light-blocking membrane has an optical density of 0.54 to 2.00 ($μm^{-1}$) in terms of thickness, and
the light-blocking membrane has a surface glossiness of 5.0% or less, and the light-blocking membrane has a static friction coefficient of less than 0.35 (μs) and/or a kinetic friction coefficient of less than 0.40 (μk) measured under the conditions of a load of 200 (g) and a speed of 100 (mm/min) in accordance with JIS-K7125: 1999.

2. The light-blocking member according to claim 1, wherein
the light-blocking membrane has a total thickness of 3 μm or more and less than 10 μm.

3. The light-blocking member according to claim 1, wherein
the substrate is a sheet-shaped substrate having one major surface, and
the light-blocking membrane is provided on one major surface of the sheet-shaped substrate.

4. The light-blocking member according to claim 1, wherein
the light-blocking membrane does not substantially contain additional matting agents other than the black pigment.

5. The light-blocking member according to claim 1, wherein
the substrate is a sheet-shaped substrate having one major surface and the other major surface, and
the light-blocking member comprising two of the light-blocking membranes, where one of the light-blocking membrane is provided on one surface of the sheet-shaped substrate, the other of the light-blocking member is provided on the other major surface of the sheet-shaped substrate.

6. The light-blocking member according to claim 1, wherein
the first black pigment contains a conductive carbon black pigment, and
the second black pigment contains a conductive carbon black pigment.

* * * * *